(12) United States Patent
Preece

(10) Patent No.: US 10,701,353 B1
(45) Date of Patent: Jun. 30, 2020

(54) PATTERN, METHOD, AND APPARATUS FOR TESTING IMAGING SYSTEM PERFORMANCE

(71) Applicant: United States of America, as represented by the Secretary of the Army, Fort Belvoir, VA (US)

(72) Inventor: Bradley L. Preece, Lorton, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 16/697,237

(22) Filed: Nov. 27, 2019

Related U.S. Application Data

(60) Provisional application No. 62/820,875, filed on Mar. 20, 2019.

(51) Int. Cl.
| | | |
|---|---|---|
| *G06K 9/00* | (2006.01) | |
| *H04N 17/00* | (2006.01) | |
| *G06T 7/80* | (2017.01) | |
| *H04M 1/02* | (2006.01) | |

(52) U.S. Cl.
CPC ............ *H04N 17/002* (2013.01); *G06K 9/00* (2013.01); *G06T 7/80* (2017.01); *G06T 2207/30168* (2013.01); *H04M 1/0202* (2013.01)

(58) Field of Classification Search
CPC .......... G06K 9/00; G06K 9/36; H04N 17/002; H04N 17/00; H04N 17/02; G06T 7/80; G06T 2207/30168; H04M 1/0202

USPC ......... 382/112, 289, 249, 274; 348/181, 180
See application file for complete search history.

(56) References Cited

U.S. PATENT DOCUMENTS

| | | | | |
|---|---|---|---|---|
| 5,600,574 | A * | 2/1997 | Reitan ............... | H04N 1/00002 702/185 |
| 5,701,369 | A * | 12/1997 | Moon ................... | H04N 19/99 382/249 |
| 5,838,833 | A * | 11/1998 | Ishikawa ............. | G06T 9/001 382/249 |
| 7,233,364 | B2 * | 6/2007 | Kondo ................. | H04N 7/0125 348/448 |
| 7,684,625 | B2 * | 3/2010 | Hyoki .................. | G06T 3/0006 358/1.2 |
| 7,697,792 | B2 * | 4/2010 | Keating .............. | G06F 16/5838 382/305 |
| 7,953,249 | B2 | 5/2011 | Mertens | |
| 8,090,218 | B2 | 1/2012 | Larkin et al. | |
| 9,355,293 | B2 * | 5/2016 | Swayn ................. | G06K 7/14 |
| 10,043,425 | B2 * | 8/2018 | Brunner .............. | G02F 1/1309 |
| 10,242,921 | B2 * | 3/2019 | Park ..................... | G06T 7/0004 |

(Continued)

*Primary Examiner* — Trang U Tran
(74) *Attorney, Agent, or Firm* — Richard J. Kim

(57) ABSTRACT

A system is disclosed, comprising a data processing device configured to receive an image of a pattern from an imaging system, calculate a bit sequence based on the pattern, and compare the bit sequence to a true bit sequence to generate an evaluation of the imaging system; and an output device configured to output the evaluation. An exemplary pattern comprises a first plurality of shapes having a first spectral characteristic and a second plurality of shapes having a second spectral characteristic, the plurality of first shapes and the plurality of second shapes being arranged in a pattern that is self-similar at different scales.

20 Claims, 9 Drawing Sheets

(56) References Cited

U.S. PATENT DOCUMENTS

2005/0064452 A1\* 3/2005 Schmid ................ C12Q 1/6837
435/6.12

\* cited by examiner

PATTERN, METHOD, AND APPARATUS FOR TESTING IMAGING SYSTEM PERFORMANCE

CROSS-REFERENCE TO RELATED APPLICATIONS

This application claims priority to U.S. Provisional Patent Application No. 62/820,875, filed on Mar. 20, 2019, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

The present invention relates generally to the testing of performance of imaging systems and, in particular, to a pattern, method, and apparatus for providing an unbiased metric output to directly compare imaging systems. The generation of the test-target and decoding algorithm is also discussed.

BACKGROUND OF THE INVENTION

Direct performance comparisons between different imaging systems are difficult, especially when imaging systems use complex optics and/or computational non-linear methods to reconstruct, enhance, or compress the imagery. Image quality metrics are often qualitative and subjective relying on observer scores. Non subjective image performance metrics often rely on several assumptions for computation, such as linear shift invariant, that cannot be applied to all imaging systems. These include metrics that rely on the Modulation Transfer Function of an imaging system. The ultimate imaging system performance is determined by the amount of useful information encoded in the final output image. This invention seeks to directly measure the amount of useful information using an information-based test-target allowing for direct unbiased quantitative measurements of any imaging system.

SUMMARY OF THE INVENTION

The present invention broadly comprises a pattern, an apparatus, and a method for testing imaging system performance.

In one embodiment, the apparatus includes a data processing device and an output device. The data processing device is configured to receive an image of a pattern from an imaging system, calculate a bit sequence based on the pattern, and compare the bit sequence to a true bit sequence to generate an evaluation of the imaging system. The output device is configured to output the evaluation.

In another embodiment, a pattern for evaluating an imaging system includes a first plurality of shapes having a first spectral characteristic and a second plurality of shapes having a second spectral characteristic, the plurality of first shapes and the plurality of second shapes being arranged in a pattern that is self-similar at different scales.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
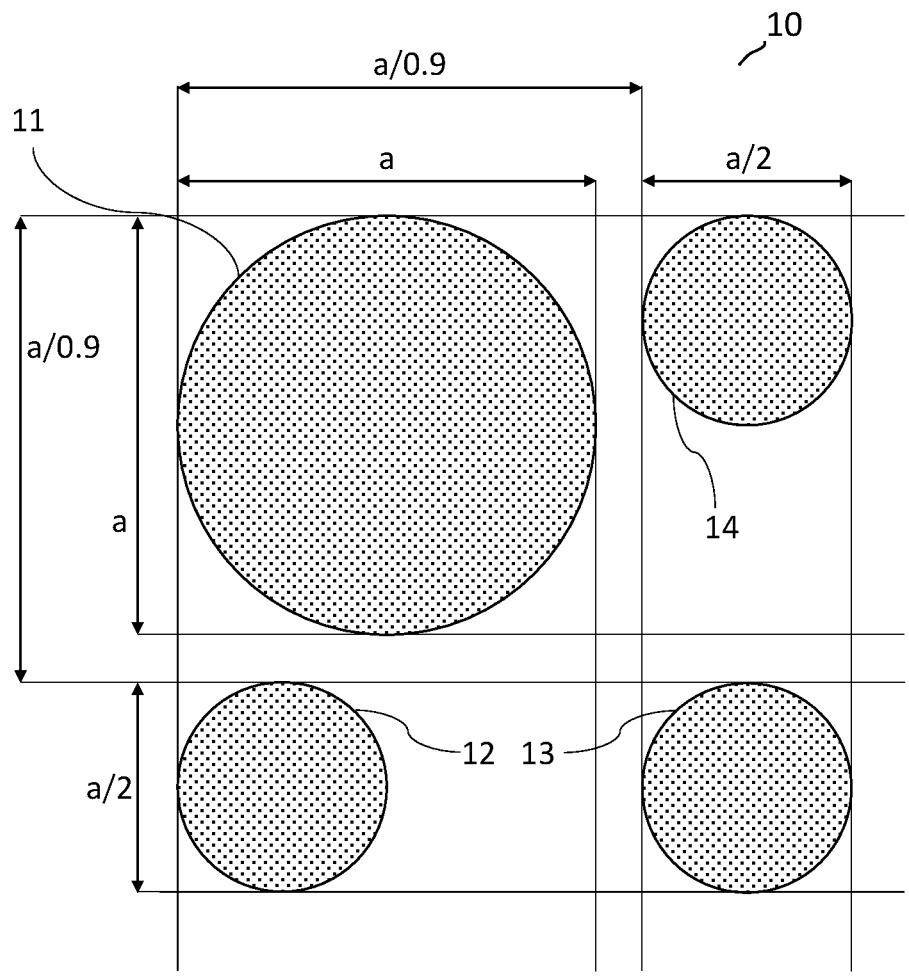
FIG. 1 illustrates the main pattern that is repeated to create the self-similar test-target.
Figure 2:
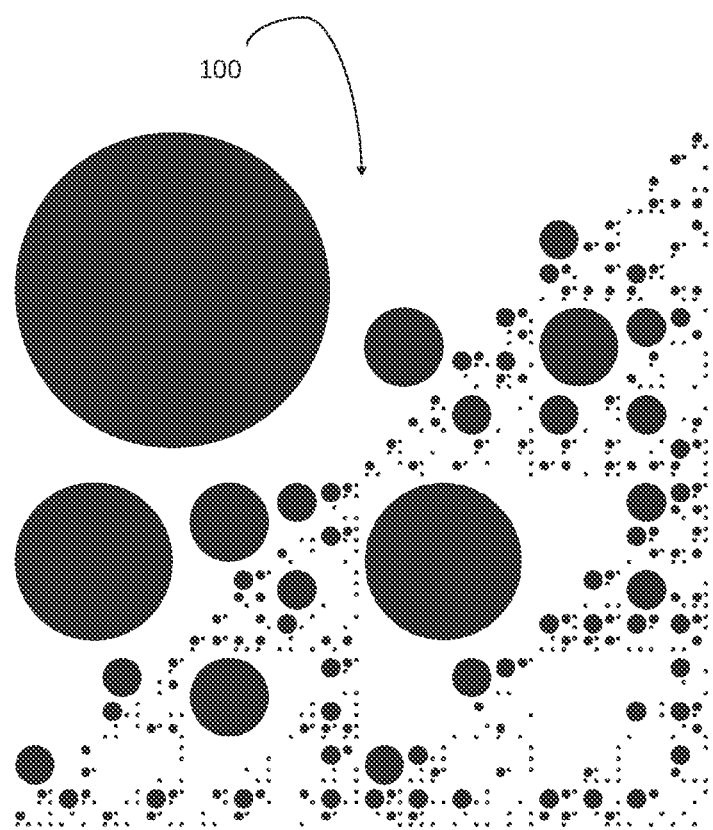
FIG. 2 illustrates the self-similar test-target created using the unique name "TestTarget1"
Figure 3:
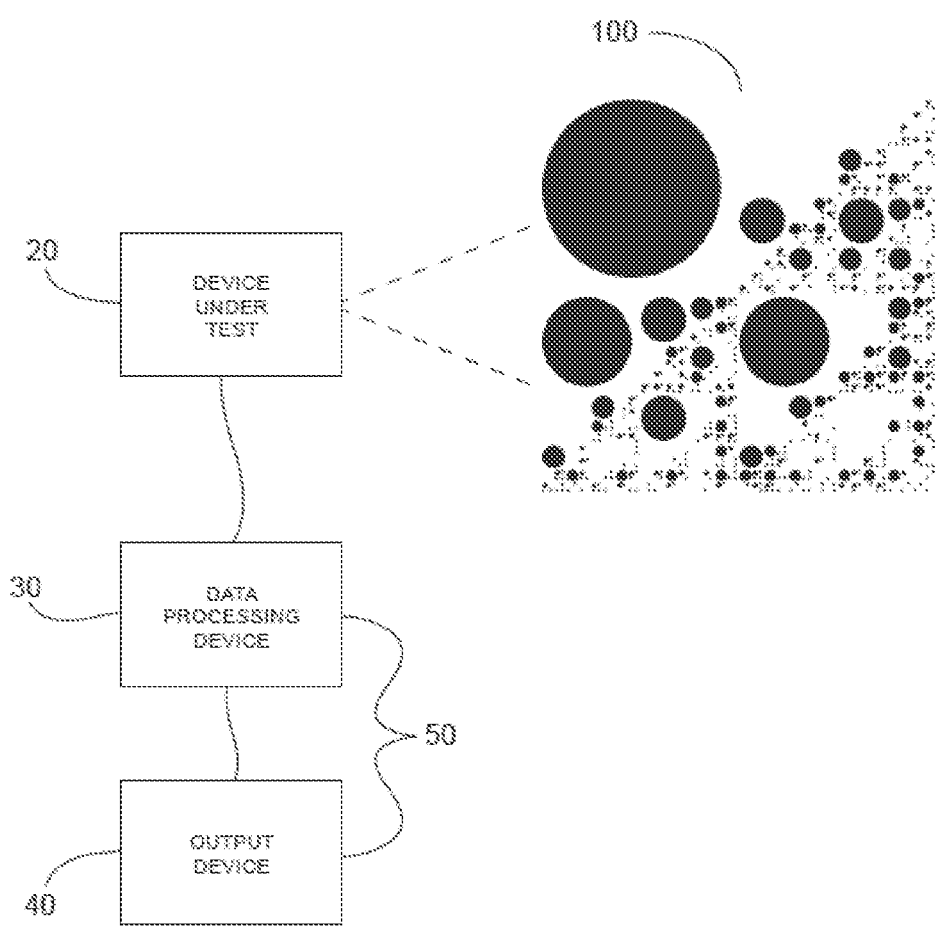
FIG. 3 illustrates a system for testing of an imaging system viewing the self-similar test-target.

FIG. 1 illustrates pattern 10 that is repeated at different scales to create test-target 100 (an example of which is shown in FIG. 2). FIGS. 1-3 show a pattern of black and white circles, which are described below. However, other colors, shapes, and orientations could be used, such as red and blue triangles in different orientations. Changes in the pattern, such as using different shapes, colors, or orientations, could be encoded as additional information. For example, 4 different triangle orientations could be encoded into 2 bits, and 8 different orientations could be encoded into 3 bits. Further, other ways of making the pattern could be used, such as shapes having different spectral reflectivity, emissivity, temperature, transmission, contrast, depth, and/or polarization. The pattern could also vary based on time, or based on the location in the pattern. Also, FIGS. 1-3 show a fractal pattern made with three shapes (sub-feature circles) at each level. However, more or less than three shapes per level could be used if desired. Finally, FIG. 1 shows that each new level of circles has a diameter of half of the previous level. However, different ratios may be used, either more or less than half the previous level. All of these modifications are within the scope of the invention as claimed.

Pattern 10 is repeated recursively to create a fractal pattern that is self-similar at different scales. Each repetition represents a new level of circles. The size a of the main-feature circle 11 at level 0 and the number of levels L determines the size of test-target 100. The main-feature circle 11 must always be on (black) for level 0. The main-feature circle 11 may be black or white for any level above level 0. (Black indicating a 1 in the binary sequence being encoded and white representing 0 in the binary sequence). In contrast, first sub-feature circle 12 (level+1), second sub-feature circle 13 (level+1), and third sub-feature circle 14 (level+1) may be black or white at any level (1 to L). The total number of bits encoded into the test-target can be calculated by:

$$N_{bits} = \sum_{n=1}^{L} 3^n$$

where L is the number of levels. If the number of levels equals six, then the test-target 100 would include 7 different circle sizes and would encode 1,092 bits (that is, test-target 100 would include 1,093 black and white circles (1,092 sub-feature black and white circles from levels 1-6 and the black level 0 circle)). Thus, the maximum amount of information, in bits, that can be encoded into the binary sequence is $N_{bits}$.

In one embodiment, redundant data may be encoded into the pattern. However, any redundant data would thus reduce correspondingly the amount of unique information that can be encoded.

The test-target 100 can be encoded in a large variety of methods depending on the imaging system and range at which the test-target needs to be observed. Different test-target designs can be defined depending on the type of imaging system being tested. Once a type is specified, test-targets 100 can be produced by creating and storing a true binary sequence. The encoding method determines the pseudo-randomness of the true binary sequence, which may include some error correction or redundant data. The test-target 100 is completely determined by the true binary sequence, the size a, and the number of levels L. Once the test-target 100 is constructed, it is viewed by an imaging system 20. Data processing device 30 then decodes the output imagery into a measured binary sequence which is then compared to the true binary sequence to determine a quality metric, such as a bit error ratio. (For an ideal imaging system, the measured binary sequence matches the true binary sequence.) Output device 40 then displays the results of the processing by data processing device 30.

The encoding design is also used by data processing device 30 to create decoding algorithms. Any number of decoding algorithms may be used by data processing device 30 where the lowest bit error ratios are used to calculate a performance based metric to quantitatively determine the imaging system performance. Data processing device 30 may use many algorithms because each algorithm may be optimal depending on the imaging conditions. The lowest bit error ratios are used to ensure an answer as close as possible to an ideal decoding algorithm. This method is designed to test the imaging system, not the performance of the decoding algorithm.

As information encoded into the test-target 100 can only be lost during imaging, no decoding algorithm can recover the lost information. Therefore, the goal of the decoding algorithm is to recover as much information as possible through the data provided by the imaging system under test 20. The better the decoding algorithm, the more unbiased the final metric. As each decoding algorithm may perform better or worse than others depending on the type of imaging system under test 20, multiple algorithms can be used, including human decoding.

In contrast, currently existing imaging system performance metrics typically are qualitatively assessed by a human or assume a linear imaging system.

FIG. 2 illustrates an exemplary test-target 100 with 6 levels and with the unique name "TestTarget1".

Figure 9:
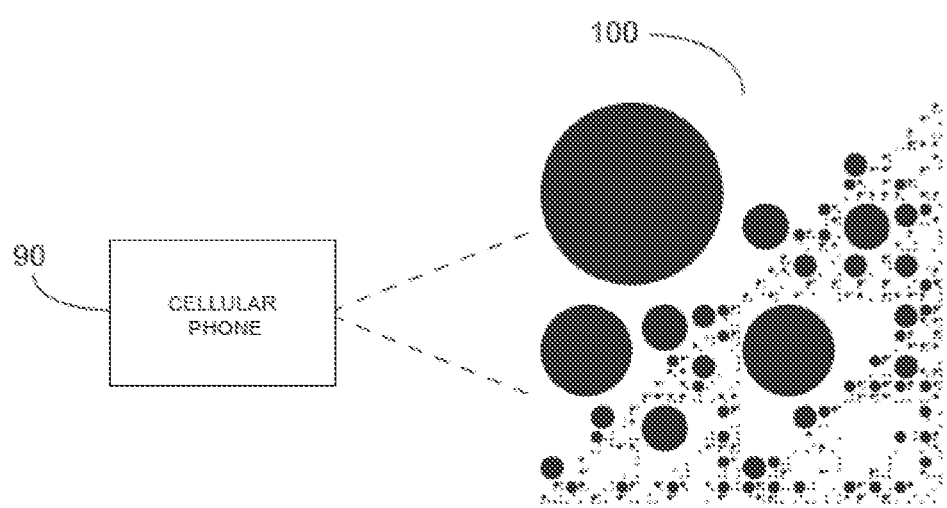
FIG. 9 illustrates an embodiment of the invention that includes a cellular telephone.

FIG. 3 illustrates the test system 50 including data processing device 30 and output device 40 communicating with an imaging system 20 under test viewing the test-target 100. The imaging system 20 may be a camera, and the test system 50 may be a computer wirelessly communicating with the imaging system 20. However, other embodiments are possible. For example, an application that performs the algorithms described herein could be downloaded onto a cellular telephone. The application could then be run by a user to test the imaging system of the cellular telephone 90, as shown in FIG. 9. Thus, the imaging system 20, data processing device 30, and output device 40 would all be components of the cellular telephone 90. These modifications are within the scope of the invention as claimed.

Figure 4:
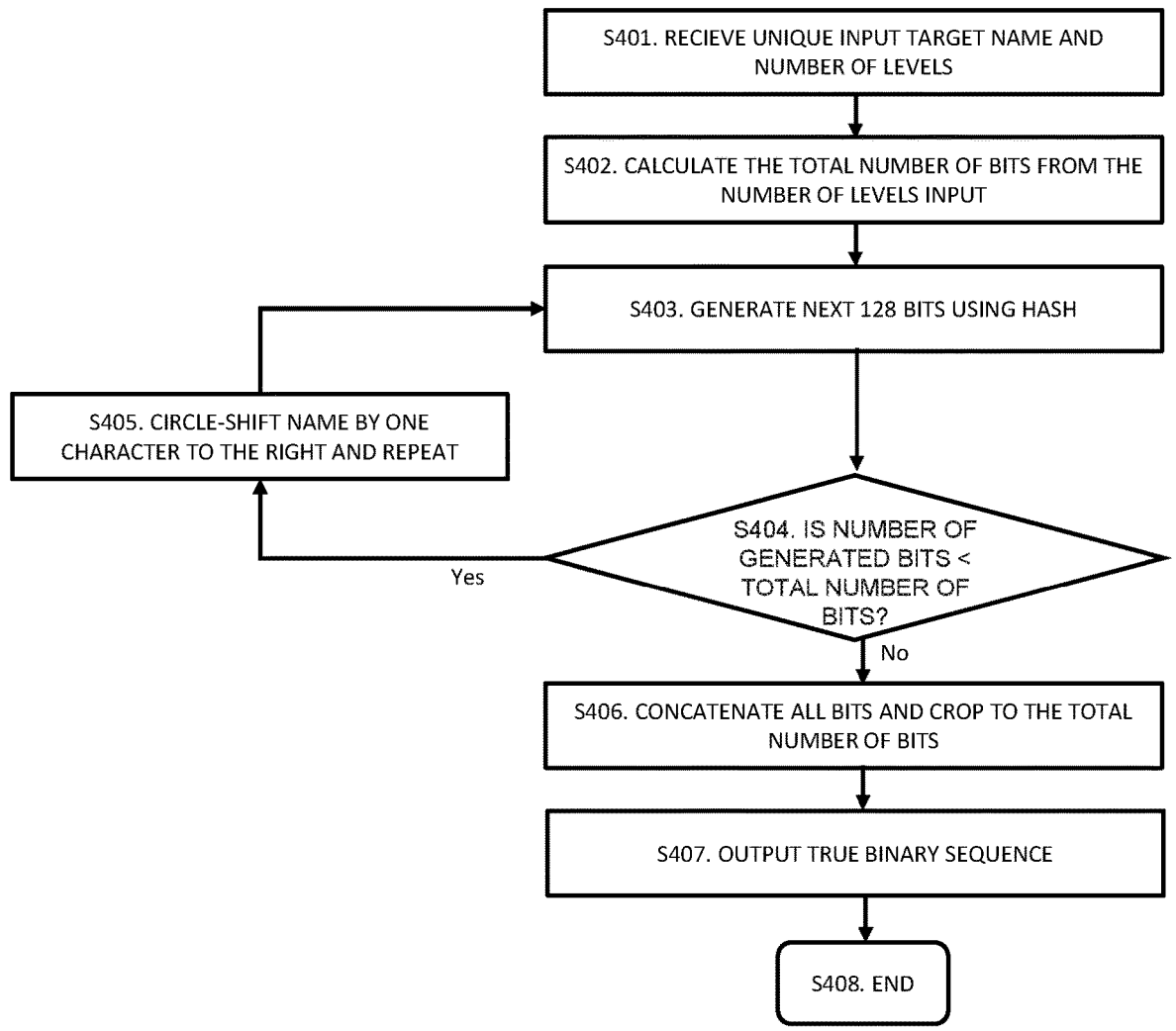
FIG. 4 illustrates a method to generate the true binary sequence from a unique input test-target name.

FIG. 4 illustrates the method to generate the true binary sequence from a unique input test-target name. In Step S401, a unique input test-target name and a number of levels L is received. Step S402 calculates the total number of bits as follows:

$$N_{bits} = \sum_{n=1}^{L} 3^n$$

where L is the input number of levels. Step S403 uses the MID5 hash to generate 128 bits based on the unique input test-target name. (However, any similar hash or process may be used to generate any number of bits at a time). The unique input test-target name should include more characters than ($N_{bits}$/the number of bits generated by each hash operation). This will prevent redundant data from being generated in the true binary sequence. Step S404 determines if the current number of cumulated generated bits is less than the total number of bits needed. If so, Step S405 circle shifts the name by one character to the right, and returns to Step S403. If not, Step S406 concatenates all the generated bits and crops to the total number of bits to generate the true binary sequence. Step S407 outputs the true binary sequence.

Figure 5:
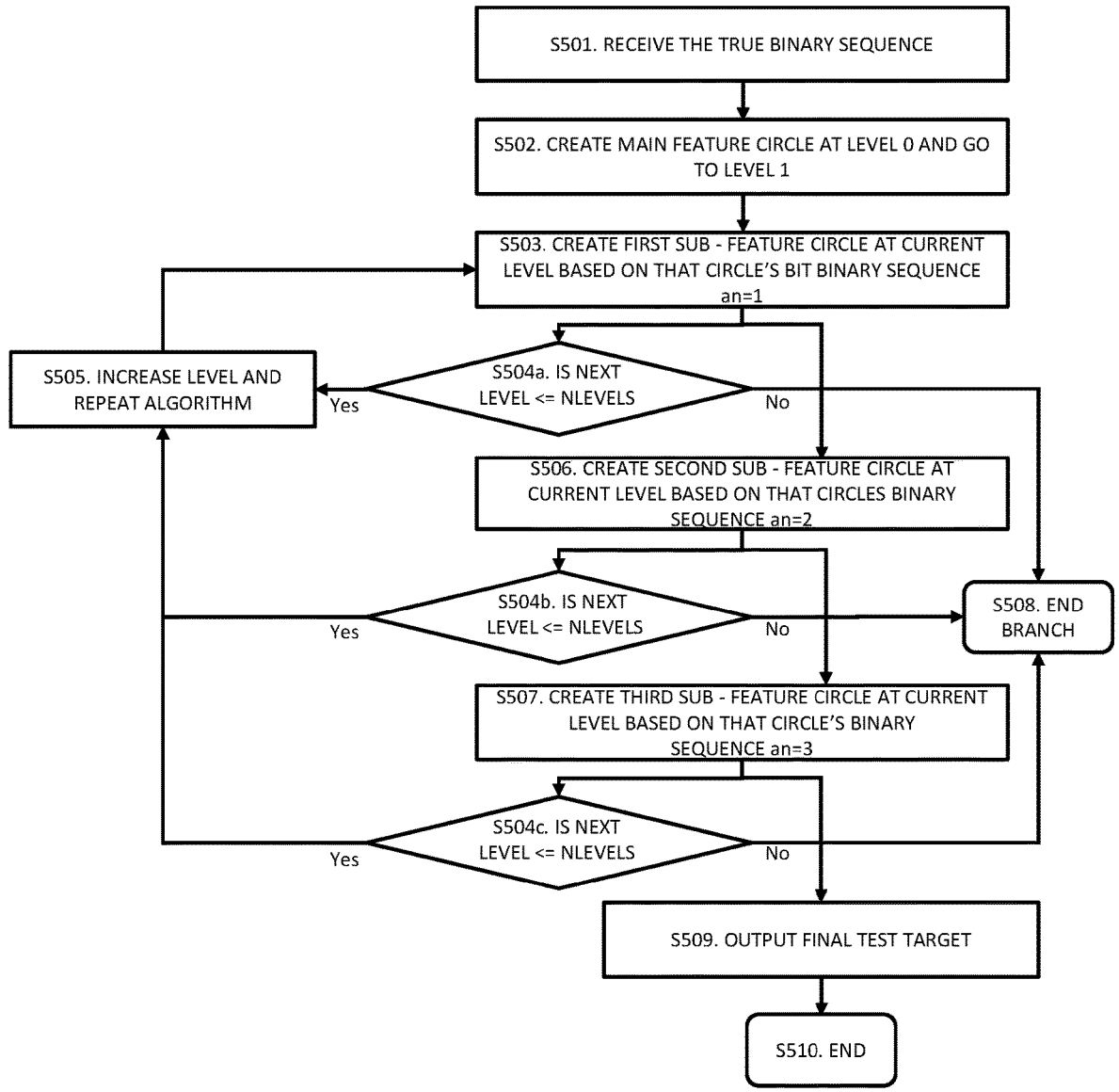
FIG. 5 illustrates a method to generate the self-similar test-target from the true binary sequence.

FIG. 5 illustrates the method to generate the test-target 100 from the true binary sequence generated by the method shown in FIG. 4. This method is recursive. Step S501 receives the true binary sequence. Step S502 creates the main feature circle 11 at level 0 and goes to level 1. Step S503 creates the first sub-feature circle 12 at the current level based on that circle's bit.

Figure 8:
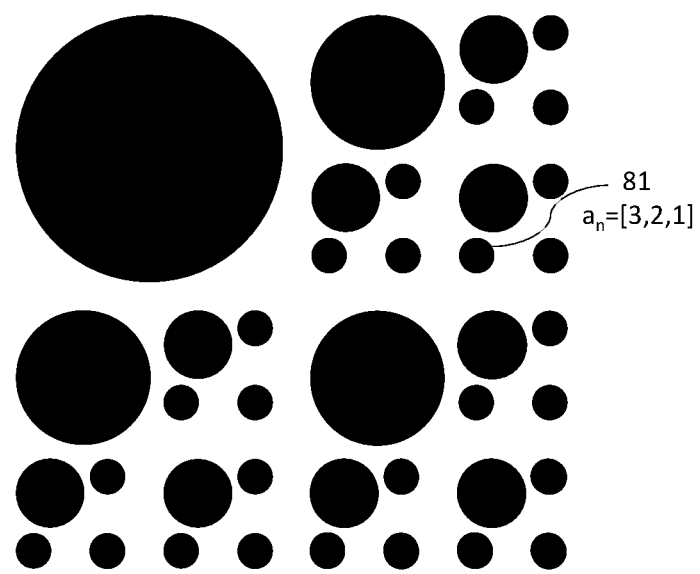
FIG. 8 illustrates an exemplary pattern to show the address A of each circle.

Each circle has an address A based upon its direction location, which can be used to determine its bit location. The address A includes an integer $a_n$ for each level of the corresponding circle. For example, the circle 81 in FIG. 8 has an address A of (3, 2, 1) because it is the first sub-feature of the third level around the second level two sub-feature, which is located around the third level one sub-feature. (FIG. 8 shows all of the circles as black for clarity. This would only be the case if the entire true binary sequence were ones.) The bit location can be calculated from A by:

$$Bit_\# = \sum_{n=1}^{l} a_n 3^{l-n}$$

where l is the level depth of that circle. For the above example of A, the bit location of $$(3,2,1) = 3 \cdot 3^{3-1} + 2 \cdot 3^{3-2} + 1 \cdot 3^{3-3} = 3 \cdot 9 + 2 \cdot 3 + 1 \cdot 1 = 34.$$

Step S504 determines if a next level would be less than or equal to the number of levels L. If so, Step S504a goes to Step S505, which increases the level and repeats Step S503. If not, Step S504a goes to Step S508 which ends that branch. Step S503 also branches to Step S506, which creates second sub-feature circle 13 at the current level based on that circle's bit. Step S506 also branches to both Step S504b and Step S507. Step S507 creates third sub-feature circle 14 at the current level based on that circle's bit. Step S507 also branches to both Step S504c and Step S509. Every branch for every level is ended by Step S508. The last branch, after all other branches from all levels have ended, is Step S507 leading to Step S509, which outputs the final test-target 100 as shown in FIG. 2.

In one embodiment, a user reviews the test-target 100 to ensure that there is a large enough sample size of black circles. (If by chance the true binary sequence was all zeros, the test-target would not be a good test of the imaging system.) For example, a user may ensure that at least one circle at every level is on (black) before using the test-target to test an imaging system.

Figure 6:
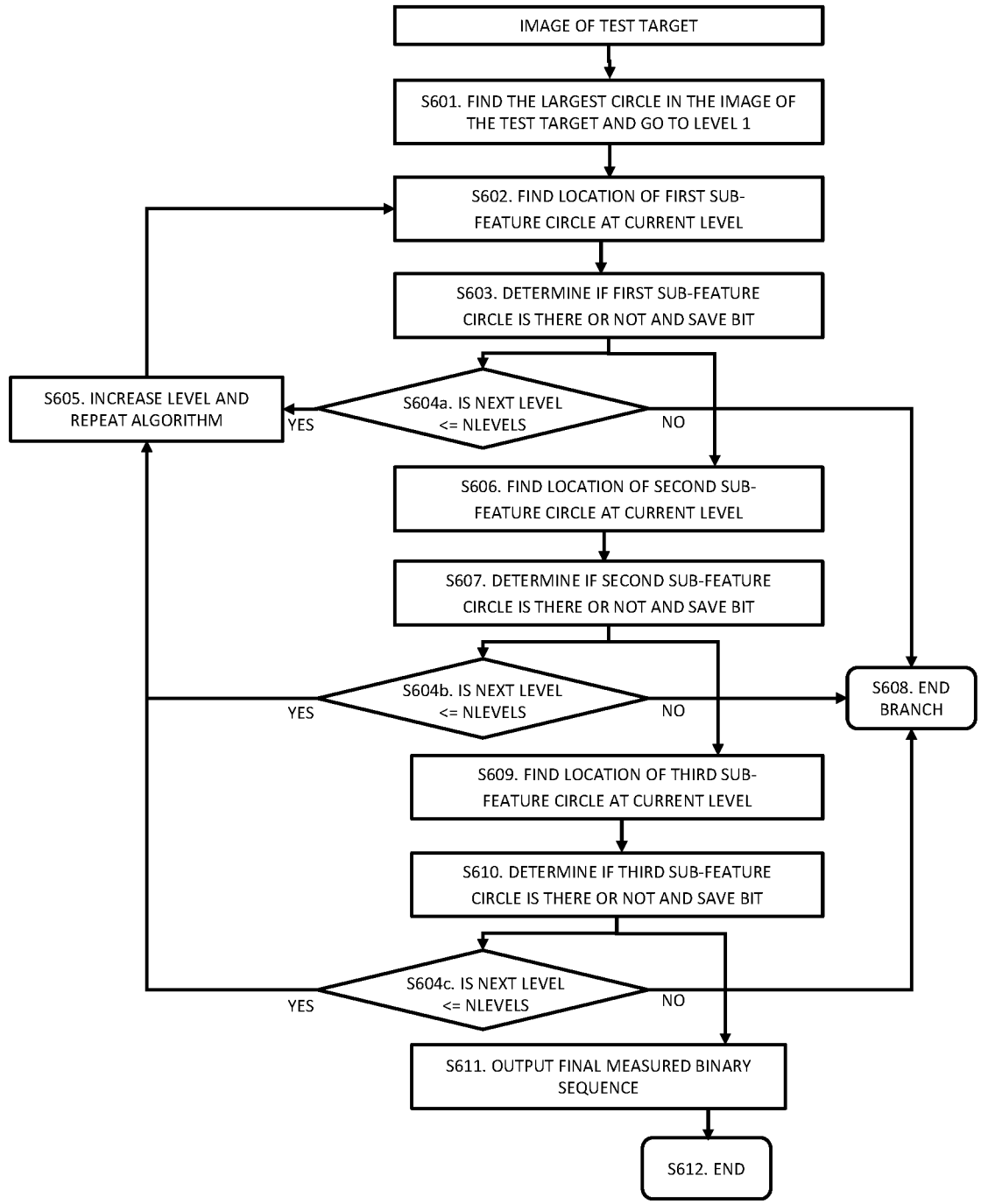
FIG. 6 illustrates a method to decode the self-similar test-target from the image taken from the imaging system under test.

FIG. 6 illustrates the method to decode the test-target 100 from the image of the test-target received from the imaging system under test 20. This method is also recursive. In Step S601, data processing device 30 finds the largest circle in the image of the test-target 100 (level 0) and then goes to level 1. Data processing device 30 then finds the location of first sub-feature circle 12 at the current level in Step S602, and determines if there is a circle there in Step S603. If a black circle is present, data processing device 30 sets the corresponding bit in the measured binary sequence to one, otherwise data processing device 30 sets the corresponding bit in the measured binary sequence to zero. Step S603 then leads to Steps S604a and S606. Step S604a determines if the next level is equal to or less than the maximum number of levels. If so, Step S605 increases the level and returns to Step S602. If not, Step S608 ends that branch. Step S606 finds second sub-feature circle 13 at the current level and Step S607 determines if there is a circle there. If a black circle is present, data processing device 30 sets the corresponding bit in the measured binary sequence to one, otherwise data processing device 30 sets the corresponding bit in the measured binary sequence to zero. Step S607 then branches to Steps S604b and S609. Step S609 finds the location of third sub-feature circle 14 at the current level. Step S610 determines if third sub-feature circle 14 is black at the current level. If a black circle is present, data processing device 30 sets the corresponding bit in the measured binary sequence to one, otherwise data processing device 30 sets the corresponding bit in the measured binary sequence to zero. Step S610 then branches to Steps S604c and S611. Every branch for every level is ended by Step S608. The last branch, after all other branches from all levels have ended, is Step S610 leading to Step S611, which outputs the final measured binary sequence.

Figure 7:
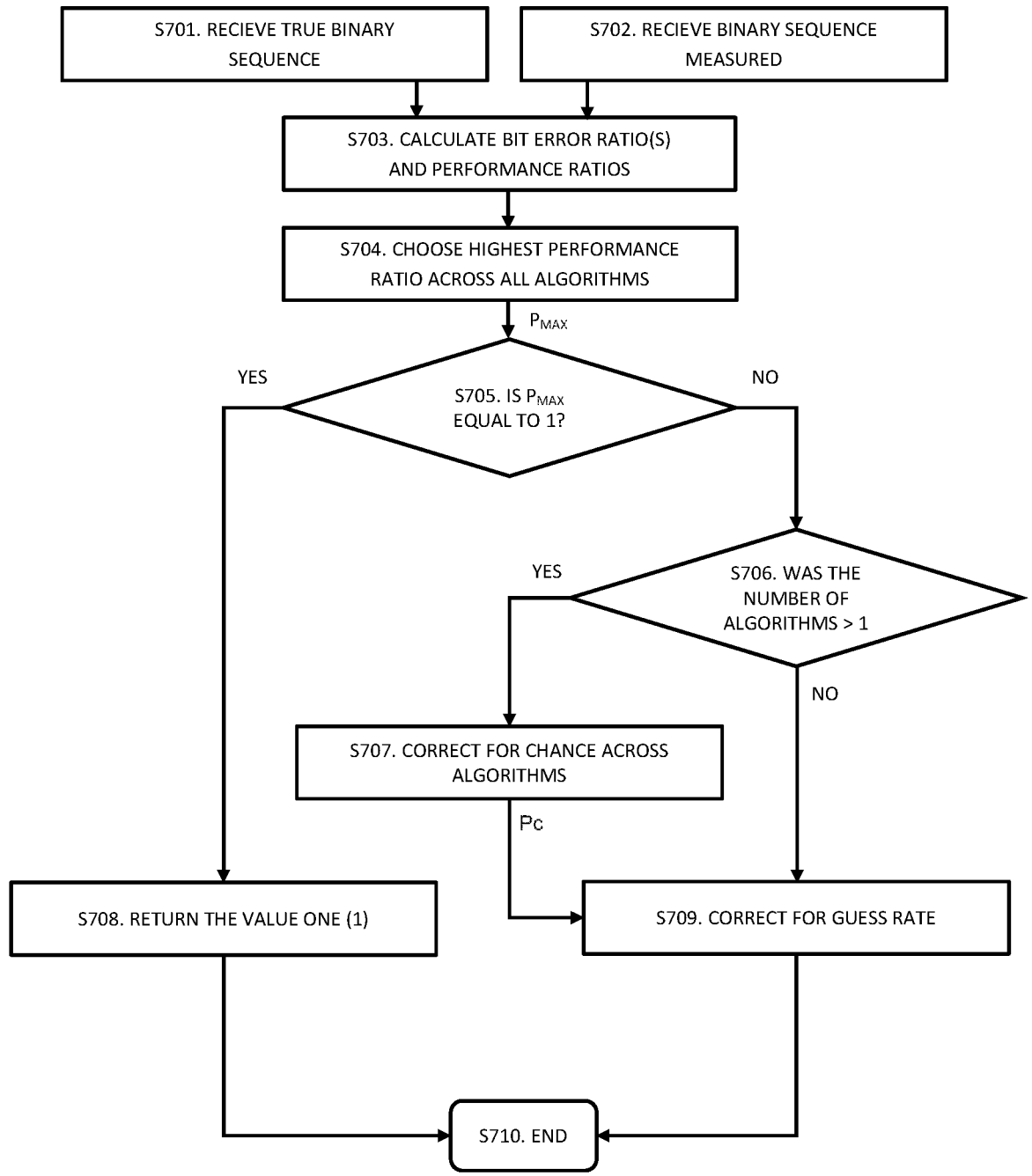
FIG. 7 illustrates a method to generate the final normalized metric output.

FIG. 7 illustrates the method to generate the final normalized metric output. This method receives the true binary sequence (Step S701) and the measured binary sequence (Step S702). Step S703 calculates the bit error ratio between the true binary sequence and the measured binary sequence. The bit error ratio (BER) is calculated as the number of bit errors, defined by the XOR logic, divided by the total number of bits $N_{bits}$. Step S703 then calculates the performance ratio p as p=1−BER. (This is done so that a higher value of p indicates better performance). This value p is calculated for each decoding algorithm used, and the maximum performance ratio over all decoding algorithms used (denoted $p_{max}$) is determined in Step S704. Step S705 determines that if Amax is equal to one, the final unbiased metric output value (denoted B) is returned as one in Step S708 and the process is finished at Step S710. If $p_{max}$ is not equal to one, Step S706 determines if more than one algorithm was used. If so, Step S707 corrects the maximum performance ratio for chance between the algorithms by:

$$p_c = \frac{p_{max}N_{bits} + \ln(\sqrt{N_a}) - \sqrt{(\ln(\sqrt{N_a}))^2 + \ln(N_a)N_{bits}(p_{max} - p_{max}^2)}}{\ln(N_a) + N_{bits}}$$

where $N_a$ is the number of algorithms, and $p_c$ is the corrected output. Note that $p_c$ is equal to $p_{max}$ if $N_a=1$. Step S709 then corrects the final unbiased metric output value B for chance of guessing for each circle by:

$$B = 2(p_c - 0.5).$$

Often the environmental conditions, such as weather and illumination conditions, have the largest impact on imaging system performance. Given an implemented test-target, the system performance can also be monitored in real time.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. For instance, contemplated versions of the test-target include encoding the information though other methods such as spectral reflectivity, emissivity, temperature, transmission, polarization, and depth, each of these methods being variable over the spatial and temporal domains, simultaneously or individually. In addition, modifications to the shape, location, orientation, and contrast of each feature and fractal pattern is contemplated. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for testing an imaging device with a self-similar test-target, said system for testing an imaging device comprising:
   a test-target disposed to show a pattern of shapes repeated recursively as a fractal pattern that is self-similar at different scales;
   an imaging device under test to view the fractal pattern on the test-target as an image of the pattern;
   a data processing device configured to receive the image of the pattern and evaluate said imaging device under test by processing the following image processing methods:

calculate a binary bit sequence using a method to decode a self-similar test-target based on the pattern, and generate a final normalized metric output as an evaluation of the imaging device using a method to generate the final normalized metric output based on comparing the binary bit sequence to a true binary bit sequence; and an output device configured to output the evaluation of the imaging device.

2. The system according to claim 1, wherein the imaging device under test, the data processing device, and the output device are all parts of a cellular telephone.

3. The system according to claim 1, wherein the data processing device and output device are part of a computer in communication with the imaging device under test.

4. The system according to claim 1, wherein said fractal pattern has shapes arranged by level and scale, each shape further characterized by color and/or orientation.

5. The system according to claim 1, wherein said fractal pattern has shapes arranged by level and scale, each shape further characterized by at least one of spectral reflectivity, emissivity, temperature, transmission, contrast, depth, and polarization.

6. The system according to claim 1, wherein said method to decode a self-similar test-target comprises the steps of:
find a largest shape in the image of the pattern shown on the test-target as level 0 and increment a level as a current level;
find a location of a first sub-feature shape at the current level;
determine if there is a shape present at the current level, wherein,
if a colored shape is present, said data processing device sets a corresponding bit in a measured binary sequence to one,
otherwise, said data processing device sets the corresponding bit in the measured binary sequence to zero;
if a next level is equal to or less than a maximum number of levels, then increment the current level and return to the step of finding a location of a first sub-feature shape at the current level;
find a second sub-feature shape at the current level;
determine if there is a shape at the current level, wherein,
if a colored shape is present, said data processing device sets a corresponding bit in the measured binary sequence to one,
otherwise, said data processing device sets the corresponding bit in the measured binary sequence to zero;
if a next level is equal to or less than a maximum number of levels, then increment the current level and return to the step of finding a location of a first sub-feature shape at the current level;
find a third sub-feature shape at the current level;
determine if there is a shape at the current level, wherein,
if a colored shape is present, said data processing device sets a corresponding bit in the measured binary sequence to one,
otherwise, said data processing device sets the corresponding bit in the measured binary sequence to zero;
if a next level is equal to or less than a maximum number of levels, then increment the current level and return to the step of finding a location of a first sub-feature shape at the current level; and output a resulting final measured binary sequence as a binary bit sequence.

7. The system according to claim 1, wherein said method to generate the final normalized metric output based on comparing the binary bit sequence to a true binary bit sequence comprises the steps of:
receive the true binary bit sequence;
receive the binary bit sequence as a measured binary sequence;
calculate a bit error ratio BER between the true binary bit sequence and the measured binary sequence to determine a performance ratio p for each decoding algorithm used;
determine a maximum performance ratio $p_{max}$ over all decoding algorithms;
if $p_{max}$ is equal to one, then,
a final unbiased metric output value B is returned as one and the process is finished;
otherwise, the maximum performance ratio $p_{max}$ is corrected as a corrected output $p_c$ for chance between the algorithms if more than one algorithm was used;
correct a final unbiased metric output value B for chance of guessing for each shape by: $B=2(p_c-0.5)$; and
output the corrected final unbiased metric output value as a final normalized metric output.

8. The system according to claim 7, wherein said bit error ratio BER is calculated as a number of bit errors, defined by XOR logic, divided by a total number of bits $N_{bits}$, wherein the performance ratio p is calculated as $p=1-BER$ for each decoding algorithm used.

9. The system according to claim 7, wherein if $p_{max}$ is not equal to one, then more than one algorithm was used, and the maximum performance ratio for chance between the algorithms is corrected by:

$$p_c = \frac{p_{max}N_{bits} + \ln(\sqrt{N_a}) - \sqrt{(\ln(\sqrt{N_a}))^2 + \ln(N_a)N_{bits}(p_{max} - p_{max}^2)}}{\ln(N_a) + N_{bits}},$$

where $N_a$ is the number of algorithms, and $p_c$ is the corrected output which is equal to $p_{max}$ if $N_a=1$.

10. A pattern repeated at different scales to create a test-target for evaluating an imaging system, said pattern repeated at different scales comprising:
a main-feature shape of a main-feature size and a first spectral characteristic is disposed at a base level;
a first sub-feature shape of a sub-feature size smaller than the main-feature size disposed at an incremented level, the first sub-feature shape being of either the first spectral characteristic or a second spectral characteristic based on its binary bit in a binary sequence $a_n$;
a second sub-feature shape of the sub-feature size smaller than the main-feature size disposed at the incremented level, the second sub-feature shape being of either the first spectral characteristic or the second spectral characteristic based on its binary bit in the binary sequence $a_n$; and
a third sub-feature shape of the sub-feature size smaller than the main-feature size disposed at the incremented level, the third sub-feature shape being of either the first spectral characteristic or the second spectral characteristic based on its binary bit in the binary sequence $a_n$, the main-feature shape and the plurality of sub-feature shapes being arranged in a pattern which is repeated recursively to create a fractal pattern that is self-similar at different scales, each repetition representing a new level at a different scale.

11. The pattern according to claim 10, wherein the first spectral characteristic is a first color in the visible spectrum and the second spectral characteristic is a second color in the visible spectrum.

12. The pattern according to claim 11, wherein the first color is black and the second color is white.

13. The pattern according to claim 10, wherein the first spectral characteristic is a first wavelength range in the infrared spectrum and the second spectral characteristic is a second wavelength range in the infrared spectrum.

14. The pattern according to claim 10, wherein the first and second shapes are circles.

15. The pattern according to claim 10, wherein the pattern is a fractal pattern.

16. The pattern according to claim 10, wherein the first spectral characteristic is a first spectral reflectivity, emissivity, temperature, transmission, contrast, depth, or polarization and the second spectral characteristic is a second spectral reflectivity, emissivity, temperature, transmission, contrast, depth, or polarization.

17. A method to generate a self-similar test-target from a true binary bit sequence comprises the steps of:
  receive a true binary bit sequence from a method to generate a true binary bit sequence;
  create a main feature shape at level 0 and go to level 1;
  create a first sub-feature shape at a current level based on that shape's bit in a binary sequence $a_n=1$;
  determine if a next level would be less than or equal to a number of levels L, and if so, increment the level and repeat the step of creating a first sub-feature shape at a current level based on that shape's bit in a binary sequence $a_n=1$;
  create a second sub-feature shape at a current level based on that shape's bit in a binary sequence $a_n=2$;
  determine if a next level would be less than or equal to a number of levels L, and if so, increment the level and repeat the step of creating a first sub-feature shape at a current level based on that shape's bit in a binary sequence $a_n=1$;
  create a third sub-feature shape at a current level based on that shape's bit in a binary sequence $a_n=3$;
  determine if a next level would be less than or equal to a number of levels L, and if so, increment the level and repeat the step of creating a first sub-feature shape at a current level based on that shape's bit in a binary sequence $a_n=1$; and
  output a final test-target as the generated self-similar test-target.

18. The method to generate a self-similar test-target according to claim 17, wherein a user reviews the test-target to ensure that there is a large enough sample size of black shapes.

19. The method to generate a self-similar test-target according to claim 17, wherein each shape has an address A based upon its direction location, which can be used to determine its bit location.

20. The method to generate a self-similar test-target according to claim 17, wherein said method to generate a true binary bit sequence comprises the steps of:
  receive a unique input test-target name and a number of levels L;
  calculate a total number of bits as follows:

$$N_{bits} = \sum_{n=1}^{L} 3^n,$$

where L is the input number of levels;
  generate a next set of 128 bits based on a unique input test-target name;
  determine if a current number of cumulated generated bits is less than a total number of bits needed, and if so, shift the name by one character to the right, and return to the step of generating a next set of 128 bits;
  concatenate all generated bits and crop to the total number of bits to generate a true binary bit sequence; and
  output the true binary bit sequence.

* * * * *